US006815862B2

(12) United States Patent
Inukai et al.

(10) Patent No.: US 6,815,862 B2
(45) Date of Patent: Nov. 9, 2004

(54) MULTILAYER BRUSH

(75) Inventors: Kyoji Inukai, Kariya (JP); Youichi Murakami, Aichi-ken (JP); Yasuyuki Wakahara, Kariya (JP); Masami Niimi, Handa (JP); Teruo Kobayashi, Fukushima-ken (JP); Hiroaki Kawamura, Fukushima-ken (JP); Nobuyuki Yamashita, Fukushima-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/771,667

(22) Filed: Feb. 4, 2004

(65) Prior Publication Data

US 2004/0174088 A1 Sep. 9, 2004

(30) Foreign Application Priority Data

Feb. 4, 2003 (JP) ....................................... 2003-026608

(51) Int. Cl.$^{7}$ ................................................ H02K 13/00
(52) U.S. Cl. ....................................... 310/251; 310/252
(58) Field of Search ................................ 310/248, 249, 310/251, 252

(56) References Cited

U.S. PATENT DOCUMENTS

| | | | | |
|---|---|---|---|---|
| 2,319,240 A | * | 5/1943 | Larsen et al. | 419/11 |
| 3,392,295 A | * | 7/1968 | Sebok | 310/228 |
| 3,601,645 A | * | 8/1971 | Whiteheart | 310/219 |
| 4,605,581 A | * | 8/1986 | Stevens et al. | 428/96 |
| 5,270,504 A | * | 12/1993 | Grohs et al. | 200/265 |
| 5,365,136 A | * | 11/1994 | Deboves | 310/252 |
| 5,701,046 A | * | 12/1997 | Kammerer et al. | 310/251 |
| 6,700,292 B2 | * | 3/2004 | Otani et al. | 310/248 |
| 6,755,882 B2 | * | 6/2004 | Otani et al. | 75/231 |

FOREIGN PATENT DOCUMENTS

| | | | |
|---|---|---|---|
| EP | 1 333 546 A2 * | 8/2003 | H01R/39/22 |
| JP | 58-29586 | 6/1983 | H01R/39/20 |
| JP | 6-7505 | 1/1994 | H01R/43/12 |
| JP | 7-213022 | 8/1995 | H02K/13/00 |

* cited by examiner

*Primary Examiner*—Burton S. Mullins
*Assistant Examiner*—Nguyen Hanh
(74) *Attorney, Agent, or Firm*—Harness, Dickey & Pierce, PLC

(57) ABSTRACT

In a multilayer brush composed chiefly of copper and graphite and incorporated therein with a solid lubricant, which consists essentially of two types of brushes, a high-copper-content part brush containing the copper in a large quantity and a low-copper-content part brush containing the copper in a small quantity, at least the high-copper-content part brush contains zinc in an amount of from 0.1% by weight to 5% by weight, and the zinc and the copper form an alloy. This can provide a multilayer brush having a superior durability, which can prevent the performance of motors from lowering, without use of the harmful substance such as lead, and may less undergo any wear due to mechanical and electrical sparkling of the brush.

6 Claims, 1 Drawing Sheet

MULTILAYER BRUSH

BACKGROUND OF THE INVENTION

1. Field of the Invention

This invention relates to a multilayer brush for electric rotating machines which is used in DC motors, e.g., a multilayer brush used in starting motors of automobiles.

2. Description of the Prior Art

Recently available DC motors are made high-speed and high-current-density so as to be made compact and lightweight. However, in the present state of things, the motors of this type may greatly lower in commutation performance, output characteristics and so forth, and may much suffer the wear of brushes, resulting in a short service life. In order to solve such problems, the structure of brushes is devised to cope with the matter because there is a limit to mere improvements in performance of brush materials. As one means therefor, the problems are solved by providing a multilayer brush devised from the form of a brush alone (see Japanese Patent Publication No. H06-007505, pages 1 to 3, FIGS. 1 and 2).

In the multilayer brush, a brush is divided into two or three portions so that short-circuit current can be restrained and commutation can be improved by making the resistance on the outlet side larger than that on the inlet side in respect to a commutator.

However, in such a multilayer brush as well, the surface of the commutator may blacken as a result of the driving of a motor for a long time, so that not only sparks may become uncontrollable but also the commutator may come to have an uneven surface to cause an increase in wear of the brush, and its durability is affected.

Brushes for motors of automobiles are also required to have durability, wear resistance, corrosion resistance and small electrical loss. They also come to have high temperature when the motor interiors have a high temperature and a high brush resistivity. Accordingly, for the purpose of lowering resistivity, a metal graphite brush is used which contains copper powder, graphite, lead, molybdenum disulfide, a novolak phenolic resin and a furfural resin (see Japanese Patent Application Laid-open No. 07-213022, pages 1 to 5).

Brushes for motors of automobiles also include brushes containing copper powder in a large quantity. Such brushes may come to have a high resistance upon oxidation of the copper when they come to have high temperature and high humidity, so that problems may arise such that electrical loss increases to cause a lowering of the performance of motors (a lowering of output). As a countermeasure therefor, a brush to which lead or lead oxide is added is devised (see Japanese Patent Publication No. 58-029586, pages 1 to 3).

However, the lead or lead oxide used as an additive is harmful, and has come to be prohibited from use in view of environment.

SUMMARY OF THE INVENTION

An object of the present invention is to provide a multilayer brush having a superior durability, which can prevent the performance of motors from lowering, without use of the harmful substance such as lead, and may less undergo any wear due to mechanical and electrical sparkling of the brush.

To achieve the above object, the present invention provides a multilayer brush composed chiefly of copper and graphite and incorporated therein with a solid lubricant, which brush consists essentially of two types of brushes, a high-copper-content part brush containing the copper in a large quantity and a low-copper-content part brush containing the copper in a small quantity, wherein;

at least the high-copper-content part brush contains zinc in an amount of from 0.1% by weight to 5% by weight, and the zinc and the copper form an alloy.

In the above multilayer brush, the low-copper-content part brush may further contain zinc in an amount of from 0.1% by weight to 3% by weight, and the zinc and the copper may form an alloy.

In the above multilayer brush in which the low-copper-content part brush further contains zinc, the high-copper-content part brush may further contain at least one of manganese and nickel in an amount of from 0.1% by weight to 3% by weight.

In the above multilayer brush in which the low-copper-content part brush further contains zinc and the high-copper-content part brush further contains at least one of manganese and nickel, the low-copper-content part brush may further contain at least one of manganese and nickel in an amount of from 0.1% by weight to 3% by weight.

In any one of the above multilayer brush, the high-copper-content part brush contains the copper in an amount of from 30% by weight to 80% by weight and the low-copper-content part brush contains the copper in an amount of from 10% by weight to less than 45% by weight.

DESCRIPTION OF THE PREFERRED EMBODIMENTS

Figure 1:
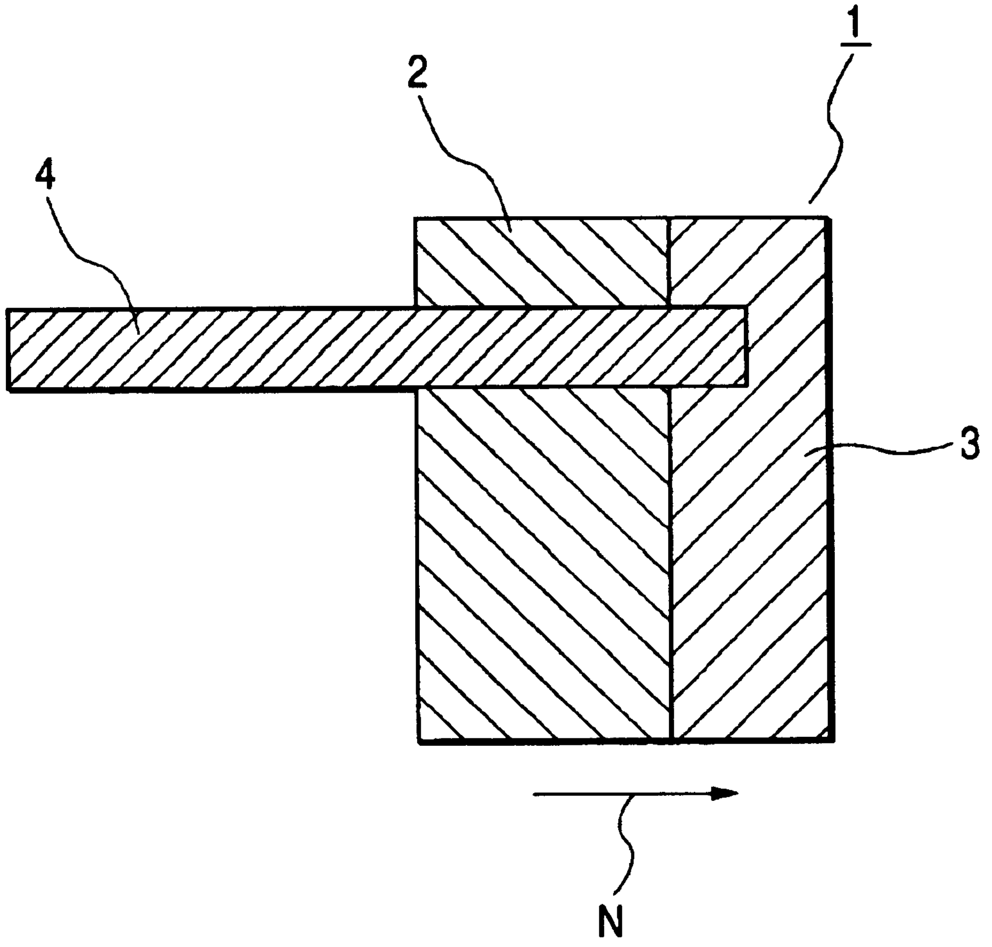
FIG. 1 is a sectional view of a multilayer brush according to Examples of the present invention.

The multilayer brush of the present invention consists essentially of two types of brushes, a high-copper-content part brush and a low-copper-content part brush which are each composed chiefly of copper and graphite and incorporated therein with a solid lubricant. As a characteristic feature of the present invention, at least the high-copper-content part brush contains zinc in a specific quantity and the zinc and the copper form an alloy.

The multilayer brush of the present invention is constituted of, as shown in FIG. 1, a high-copper-content part brush 2 and a low-copper-content part brush 3, and in addition thereto a lead wire 4. When used, the high-copper-content part brush 2 is set on the inlet side of the rotational direction N of a commutator, and the low-copper-content part brush 3 on the outlet side of the rotational direction N of the commutator. This can lessen the formation of a blackened film on the commutator surface because of sparks, and can keep a uniform and blackening-free good film for a long time to improve commutation. Incidentally, in FIG. 1, reference numeral 1 denotes the multilayer brush.

In the present invention, as the solid lubricant, usable are molybdenum disulfide, tungsten disulfide and the like. Any of these may be contained in the high-copper-content part brush and low-copper-content part brush in an amount of from 1% by weight to 5% by weight each, and more preferably from 2% by weight to 4% by weight each.

The zinc contained in the high-copper-content part brush is in an amount within the range of from 0.1% by weight to 5% by weight, more preferably from 0.3% by weight to 4% by weight, and still more preferably from 0.5% by weight to 3.5% by weight, in the high-copper-content part brush. If it is in an amount of less than 0.1% by weight, the output of the motor may greatly lower. If it is in an amount of more than 5% by weight, the brush may have a low lifetime and the commutator may greatly wear.

Thus, the multilayer brush according to an embodiment of the present invention is a multilayer brush composed chiefly of copper and graphite and incorporated therein with a solid lubricant, which brush consists essentially of two types of brushes, the high-copper-content part brush containing the copper in a large quantity and the low-copper-content part brush containing the copper in a small quantity, and, in this brush, at least the high-copper-content part brush contains zinc in an amount of from 0.1% by weight to 5% by weight, and the zinc and the copper form an alloy. In another embodiment of the present invention, zinc may further optionally be added to the low-copper-content part brush. The zinc added thereto may preferably be in an amount of from 0.1% by weight to 3% by weight, more preferably from 0.2% by weight to 2.5% by weight, and still more preferably from 0.5% by weight to 2% by weight, in the low-copper-content part brush.

The multilayer brush according to the embodiments of the present invention is parted into the high-copper-content part brush and the low-copper-content part brush by the content of the copper. Of these, the copper held in the high-copper-content part brush may preferably be in a proportion of from 30% by weight to 80% by weight, and more preferably from 45% by weight to 65% by weight, in the high-copper-content part brush. On the other hand, the copper held in the low-copper-content part brush may preferably be in a proportion of from 10% by weight to 45% by weight, and more preferably from 15% by weight to 40% by weight, in the low-copper-content part brush.

In the above high-copper-content part brush and low-copper-content part brush, in addition to the above components, any of manganese, nickel and so forth may optionally be added in view of an improvement in lifetime and output. Any of the manganese, nickel and so forth may be used alone or may be used in the form of a mixture of two or more. Any of the manganese, nickel and so forth may be contained in an amount of from 0.1% by weight to 3% by weight, and more preferably from 0.3% by weight to 2% by weight, in either of the high-copper-content part brush and the low-copper-content part brush. Incidentally, any of the manganese and nickel may be used as a mixed powder with other metal as exemplified by a mixed powder of Cu—Mn, Cu—Mn—Fe, Cu—Ni, Ag—Ni or the like (in the case of Cu, within the range not exceeding the amount specified for the chief component Cu).

As the copper used as the chief component in each of the high-copper-content part brush and the low-copper-content part brush, an electrolytic copper powder having an average particle diameter of 70 μm or less may preferably be used in view of an improvement in output and an improvement in mechanical strength. As the graphite, natural graphite may preferably be used, which has well grown crystals and good lubricity. There are no particular limitations on the particle diameter of the graphite. Usually, it is preferable to use graphite having an average particle diameter of approximately from 30 μm to 200 μm. Incidentally, in the embodiments of the present invention, the average particle diameter is determined by a method prescribed in commonly available particle size distribution measurement made by laser diffractometry.

To obtain the multilayer brush, in order to provide the high-copper-content part brush and the low-copper-content part brush, powders of the respective materials shown above are weighed out in prescribed quantities, and then uniformly mixed by means of a mixer to obtain a high-copper-content part mixed powder and a low-copper-content part mixed powder. Thereafter, these mixed powders are separately filled into a molding die at its preset positions to carry out molding at a pressure of from 200 MPa to 600 MPa, followed by sintering in a reducing atmosphere and then mechanical working into a stated size. Incidentally, the zinc and the copper form an alloy in the course of the above sintering.

EXAMPLES

The present invention is described below in greater detail by giving Examples.

Examples 1 to 3

Electrolytic copper powder of 30 μm in average particle diameter (trade name: CE-25, available from Fukuda Kinzokuhakufun Kogyo K.K.) and zinc powder of 30 μm in average particle diameter were weighed out in the compositional proportion shown in Table 1, and these were primarily mixed for 10 minutes by means of a mixer.

Separately from the above, 80% by weight of natural graphite powder of 30 μm in average particle diameter (trade name CB-150, available from Nippon Kokuen Kogyo K.K.) and 20% by weight of phenol resin (trade name VP11N, available from Hitachi Chemical Co., Ltd.) were kneaded, and the kneaded product obtained was dried and then pulverized to obtain a resin-mixed graphite powder of 150 μm in average particle diameter. Thereafter, the 10-minute primarily mixed powder obtained as described above, the resin-mixed graphite powder and molybdenum disulfide of 5 μm in average particle diameter were weighed out in the compositional proportion shown in Table 1, and these were secondarily mixed for 1 hour by means of a mixer to obtain high-copper-content part powders.

Meanwhile, the same electrolytic copper powder, resin-mixed graphite powder and molybdenum disulfide as those used in the above were weighed out in the compositional proportion shown in Table 1, and these were mixed for 1 hour by means of a mixer to obtain low-copper-content part powders.

Incidentally, in Table 1, the amount of the graphite mixed is the amount of natural graphite from which that of the phenol resin was excluded (the same applied in Examples and Comparative Example given later).

Next, after the shape of the desired brush, the high-copper-content part powders and low-copper-content part powders obtained as described above were each separately filled into a molding die at its preset positions, and also a lead wire was set at a preset position. Thereafter, molding was carried out at a pressure of from 392 MPa, and the temperature was raised to 700° C. over a period of 3 hours in a reducing atmosphere, where sintering was carried out at 700° C. Then, the sintered products obtained were each mechanically so worked that the high-copper-content part brush had an external shape in a size of 16 mm×15 mm×5 mm thick, and the low-copper-content part brush in a size of 16 mm×15 mm×2 mm thick, to obtain multilayer brushes in a size of 16 mm×15 mm×7 mm thick each (in the following Examples and Comparative Example as well, multilayer brushes having the same size were obtained).

Example 4 to 6

High-copper-content part powders were obtained through the same steps as those in Examples 1 to 3.

Meanwhile, the same electrolytic copper powder and zinc powder as those used in Examples 1 to 3 were weighed out in the compositional proportion shown in Table 1, and these were primarily mixed for 10 minutes by means of a mixer. Thereafter, this primarily mixed powder, the same resin-mixed graphite powder as that obtained in Examples 1 to 3 and the same molybdenum disulfide as that used in Examples 1 to 3 were weighed out in the compositional proportion shown in Table 1, and these were secondarily mixed for 1 hour by means of a mixer to obtain low-copper-content part powders.

Subsequently, the same steps of molding and so forth as those in Examples 1 to 3 were repeated to obtain multilayer brushes.

Example 7 to 10

The same electrolytic copper powder and zinc powder as those used in Examples 1 to 3 were weighed out in the compositional proportion shown in Table 1, and these were primarily mixed for 10 minutes by means of a mixer. Thereafter, this primarily mixed powder, the same resin-mixed graphite powder as that obtained in Examples 1 to 3, the same molybdenum disulfide as that used in Examples 1 to 3 and manganese powder of 40 $\mu$m in average particle diameter were weighed out in the compositional proportion shown in Table 1, and these were secondarily mixed for 1 hour by means of a mixer to obtain high-copper-content part powders.

Meanwhile, low-copper-content part powders were obtained through the same steps as those in Examples 1 to 3.

Subsequently, the same steps of molding and so forth as those in Examples 4 to 6 were repeated to obtain multilayer brushes.

Example 11 to 13

The same electrolytic copper powder and zinc powder as those used in Examples 1 to 3 were weighed out in the compositional proportion shown in Table 1, and these were primarily mixed for 10 minutes by means of a mixer. Thereafter, this primarily mixed powder, the same resin-mixed graphite powder as that obtained in Examples 1 to 3, the same molybdenum disulfide as that used in Examples 1 to 3 and nickel powder of 30 $\mu$m in average particle diameter were weighed out in the compositional proportion shown in Table 1, and these were secondarily mixed for 1 hour by means of a mixer to obtain high-copper-content part powders.

Meanwhile, low-copper-content part powders were obtained through the same steps as those in Examples 4 to 6.

Subsequently, the same steps of molding and so forth as those in Examples 1 to 3 were repeated to obtain multilayer brushes.

Example 14 and 15

High-copper-content part powders were obtained through the same steps as those in Examples 7 to 10.

Meanwhile, the same electrolytic copper powder and zinc powder as those used in Examples 1 to 3 were weighed out in the compositional proportion shown in Table 1, and these were primarily mixed for 10 minutes by means of a mixer. Thereafter, this primarily mixed powder, the same resin-mixed graphite powder as that obtained in Examples 1 to 3, the same molybdenum disulfide as that used in Examples 1 to 3 and the same manganese powder as that used in Examples 7 to 10 were weighed out in the compositional proportion shown in Table 1, and these were secondarily mixed for 1 hour by means of a mixer to obtain low-copper-content part powders.

Subsequently, the same steps of molding and so forth as those in Examples 1 to 3 were repeated to obtain multilayer brushes.

Comparative Example 1

The same electrolytic copper powder as that used in Examples 1 to 3, the same resin-mixed graphite powder as that obtained in Examples 1 to 3, the same molybdenum disulfide as that used in Examples 1 to 3 and lead were weighed out in the different two manners of compositional proportions as shown in Table 1, and these were mixed for 1 hour by means of a mixer to obtain a high-copper-content part powder and a low-copper-content part powder both of which contained no zinc.

Subsequently, the same steps of molding and so forth as those in Examples 1 to 3 were repeated to obtain a multilayer brush.

Comparative Example 2

The same electrolytic copper powder as that used in Examples 1 to 3, the same resin-mixed graphite powder as that obtained in Examples 1 to 3 and the same molybdenum disulfide as that used in Examples 1 to 3 were weighed out in the different two manners of compositional proportions as shown in Table 1, and these were mixed for 1 hour by means of a mixer to obtain a high-copper-content part powder and a low-copper-content part powder both of which contained no zinc.

Subsequently, the same steps of molding and so forth as those in Examples 1 to 3 were repeated to obtain a multilayer brush.

Comparative Example 3

A high-copper-content part powder and a low-copper-content part powder were obtained through the same steps as those in Examples 1 to 3 except that materials were used and weighed out in the compositional proportions as shown in Table 1.

Subsequently, the same steps of molding and so forth as those in Examples 1 to 3 were repeated to obtain a multilayer brush containing 6% by weight of zinc.

Next, a high-current cycle test on the multilayer brushes obtained in Examples 1 to 5 and Comparative Examples 1 to 3 was conducted to make evaluation on voltage drop and change value of voltage drop. Using these multilayer brushes, an actual-use durability test on starting motors for automobiles was also conducted to make evaluation on brush lifetime, output deterioration rate and commutator wear. Results obtained are shown together in Table 2. The test and evaluation on each item are made in the following way.

To conduct the high-current cycle test on the multilayer brushes, a tester having a copper ring of 80 mm in diameter was used. In repeated operation at a current density of 140 A/cm$^2$, a brush pressing force of 7 N and a number of revolutions of 0 to 7,000 min$^{-1}$, the difference in voltage between each multilayer brush and the copper ring was measured to regard the measured value as the voltage drop. The value of change of the initial-stage value after a 6-hour test was regarded as the change value of voltage drop.

As to the actual-use durability test on starting motors for automobiles, a 1.4 kW starting motor was fitted to a 1.8 liter gasoline engine, and the motor was driven over 10,000 cycles (repetition of ON for 2 seconds and OFF for 28 seconds). The brush lifetime was calculated from a difference of the size after test from the size before test. The output deterioration rate is the value which is found from a difference in output characteristic value between that before the above lifetime test and that after the same and is expressed in percentage. The commutator wear is the value found from a difference in wear between the wear before the above lifetime test and that after the same, and is expressed in percentage.

TABLE 1

(% by weight)

| | High-copper-content part brush components | | | | | | | Low-copper-content part brush components | | | | | |
|---|---|---|---|---|---|---|---|---|---|---|---|---|---|
| | Cu | Graphite | $MoS_2$ | Pb | Zn | Mn | Ni | Cu | Graphite | $MoS_2$ | Pb | Zn | Mn |
| Example: | | | | | | | | | | | | | |
| 1 | 59 | 36.8 | 3.2 | — | 1 | — | — | 30 | 65.6 | 4.4 | — | — | — |
| 2 | 59 | 36.5 | 3 | — | 1.5 | — | — | 30 | 65.6 | 4.4 | — | — | — |
| 3 | 59 | 35 | 3 | — | 3 | — | — | 30 | 65.6 | 4.4 | — | — | — |
| 4 | 58 | 38.5 | 3 | — | 0.5 | — | — | 33 | 62.7 | 4.2 | — | 0.1 | — |
| 5 | 58 | 38.5 | 3 | — | 0.5 | — | — | 33 | 62.3 | 4.2 | — | 0.5 | — |
| 6 | 58 | 37.5 | 3 | — | 1.5 | — | — | 33 | 60.8 | 4.2 | — | 2 | — |
| 7 | 56 | 36.8 | 3.2 | — | 1.5 | 0.5 | — | 30 | 65.4 | 4.4 | — | 0.2 | — |
| 8 | 56 | 37.5 | 3.5 | — | 1.5 | 1.5 | — | 35 | 60.5 | 3 | — | 1.5 | — |
| 9 | 56 | 36 | 3.5 | — | 1.5 | 3 | — | 35 | 61.5 | 3 | — | 0.5 | — |
| 10 | 56 | 37.5 | 3.5 | — | 1.5 | 1.5 | — | 35 | 59 | 3 | — | 3 | — |
| 11 | 60 | 35.8 | 3.2 | — | 0.5 | — | 0.5 | 33 | 62.6 | 4.2 | — | 0.2 | — |
| 12 | 58 | 37.3 | 3.2 | — | 1 | — | 0.5 | 30 | 65.4 | 4.4 | — | 0.2 | — |
| 13 | 58 | 36.8 | 3.2 | — | 1.5 | — | 0.5 | 30 | 65.4 | 4.4 | — | 0.2 | — |
| 14 | 58 | 37 | 3 | — | 1.5 | 0.5 | — | 30 | 65.2 | 4.4 | — | 0.2 | 0.2 |
| 15 | 58 | 37 | 3 | — | 1.5 | 0.5 | — | 30 | 64.1 | 4.4 | — | 0.5 | 1 |
| Comparative Example: | | | | | | | | | | | | | |
| 1 | 59 | 36 | 3 | 2 | — | — | — | 30 | 64.6 | 4.4 | 1 | — | — |
| 2 | 60 | 36.8 | 3.2 | — | — | — | — | 30 | 65.6 | 4.4 | — | — | — |
| 3 | 59 | 32 | 3 | — | 6 | — | — | 30 | 65.6 | 4.4 | — | — | — |

TABLE 2

| | High-current cycle test | | Actual-use durability test | | |
|---|---|---|---|---|---|
| | Voltage drop (V) | Voltage drop change value (V) | Life-time (x10,000 times) | Output deterio-ration rate (%) | Com-muta-tor wear (μm) |
| Example: | | | | | |
| 1 | 0.52 | 0.06 | 3.0 | 5 | 12 |
| 2 | 0.50 | 0.08 | 3.4 | 4 | 24 |
| 3 | 0.45 | 0.11 | 3.9 | 7 | 190 |
| 4 | 0.49 | 0.11 | 3.0 | 9 | 10 |
| 5 | 0.48 | 0.10 | 3.2 | 5 | 8 |
| 6 | 0.48 | 0.07 | 4.2 | 6 | 28 |
| 7 | 0.60 | 0.06 | 4.2 | 5 | 28 |
| 8 | 0.33 | no change | 5.7 | 2 | 25 |
| 9 | 0.30 | 0.04 | 5.0 | 8 | 90 |
| 10 | 0.48 | 0.07 | 5.9 | 8 | 74 |
| 11 | 0.46 | 0.10 | 3.0 | 5 | 15 |
| 12 | 0.65 | 0.06 | 3.4 | 3 | 60 |
| 13 | 0.36 | 0.01 | 4.9 | 6 | 60 |
| 14 | 0.50 | 0.03 | 3.8 | 5 | 74 |
| 15 | 0.54 | 0.07 | 3.4 | 7 | 126 |
| Comparative Example: | | | | | |
| 1 | 0.51 | 0.01 | 3.3 | 3 | 26 |
| 2 | 0.60 | 0.15 | 3.0 | 15 (NG) | 8 |
| 3 | 0.47 | 0.13 | 2.8 (NG) | 10 | 450 (NG) |
| Evaluation judgement values: | | | | | |
| | — | — | 30,000 times or more | 10% or less | Aimed at 200 μm or less |

As shown in Table 2, it is clear that the multilayer brushes of Examples 1 to 15 show small voltage drop and small change values of voltage drop, and that, like the conventional multilayer brush of Comparative Example 1, in which the lead has been added, they have good brush lifetime and output deterioration rate and that they cause less wear of the commutator, all satisfying the standard evaluation values. On the other hand, it has been ascertained that the multilayer brush of Comparative Example 2, in which no zinc added, shows a large change value of voltage drop and a very poor output deterioration rate of as large as 15%, and that the multilayer brush of Comparative Example 3, in which 6% by weight of zinc has been incorporated in the high-copper-content part brush, shows a large change value of voltage drop and also a short lifetime of as small as 28,000 times, and causes much commutator wear of as large as 450 μm.

As described above, multilayer brushes are provided which has values falling under any of voltage drop of from 0.30 to 0.65 (V), voltage drop change value (V) of from 0.01 to 0.15 (V) and commutator wear of from 8 to 190 (μm) in regard to the various data obtained in the above high-current cycle test and actual-use durability test.

Thus, the multilayer brush of the present invention is a multilayer brush having a superior durability and very favorable in industrial use, which can lessen the formation of a blackened film on the commutator surface because of sparks to prevent the performance of motors from lowering, without use of lead, and may less undergo any wear due to mechanical and electrical sparkling of the brush.

What is claimed is:

1. A multilayer brush composed chiefly of copper and graphite and incorporated therein with a solid lubricant, which brush consists essentially of two types of brushes, a high-copper-content part brush containing the copper in a large quantity and a low-copper-content part brush containing the copper in a small quantity, wherein;

at least the high-copper-content part brush contains zinc in an amount of from 0.1% by weight to 5% by weight, and the zinc and the copper form an alloy.

2. The multilayer brush according to claim 1, wherein the low-copper-content part brush further contains zinc in an amount of from 0.1% by weight to 3% by weight, and the zinc and the copper form an alloy.

3. The multilayer brush according to claim 2, wherein the high-copper-content part brush further contains at least one of manganese and nickel in an amount of from 0.1% by weight to 3% by weight.

4. The multilayer brush according to claim 3, wherein the low-copper-content part brush further contains at least one of manganese and nickel in an amount of from 0.1% by weight to 3% by weight.

5. The multilayer brush according to claim 1, wherein the high-copper-content part brush contains the copper in an amount of from 30% by weight to 80% by weight and the low-copper-content part brush contains the copper in an amount of from 10% by weight to less than 45% by weight.

6. A multilayer brush composed chiefly of copper and graphite and incorporated therein with a solid lubricant, which consists essentially of two types of brushes, a high-copper-content part brush containing the copper in a large quantity and a low-copper-content part brush containing the copper in a small quantity, wherein;

the multilayer brush has values falling under any of voltage drop of from 0.30 to 0.65 (V), voltage drop change value of from 0.01 to 0.15 (V) and commutator wear of from 8 to 190 (μm) when, in a high-current cycle test on the multilayer brush, a tester having a copper ring of 80 mm in diameter is used, the test is made in repeated operation at a current density of 140 A/cm$^2$, a brush pressing force of 7 N and a number of revolutions of from 0 to 7,000 min$^{-1}$, the difference in voltage between each multilayer brush and the copper ring is measured to regard the measured value as the voltage drop, and the value of change of the initial-stage value after a 6-hour test is regarded as the change value of voltage drop, and when, in an actual-use durability test on starting motors for automobiles, a 1.4 kW starting motor is fitted to a 1.8 liter gasoline engine, the motor is driven over 10,000 cycles (repetition of ON for 2 seconds and OFF for 28 seconds), and the commutator wear is calculated from a difference in wear between the wear before a brush lifetime test and that after the same.

* * * * *